United States Patent
Nakagawa et al.

(10) Patent No.: US 11,013,990 B2
(45) Date of Patent: May 25, 2021

(54) VIBRATION CONTROL APPARATUS

(71) Applicant: Sony Interactive Entertainment Inc., Tokyo (JP)

(72) Inventors: Yusuke Nakagawa, Kanagawa (JP); Ikuo Yamano, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/500,659

(22) PCT Filed: Apr. 19, 2017

(86) PCT No.: PCT/JP2017/015740
§ 371 (c)(1),
(2) Date: Oct. 3, 2019

(87) PCT Pub. No.: WO2018/193557
PCT Pub. Date: Oct. 25, 2018

(65) Prior Publication Data
US 2020/0061460 A1   Feb. 27, 2020

(51) Int. Cl.
*A63F 13/285* (2014.01)
*A63F 13/215* (2014.01)
*G06F 3/01* (2006.01)
*G06F 3/16* (2006.01)
*G10L 15/22* (2006.01)
*H04R 3/04* (2006.01)

(52) U.S. Cl.
CPC ......... *A63F 13/285* (2014.09); *A63F 13/215* (2014.09); *G06F 3/016* (2013.01); *G06F 3/165* (2013.01); *G10L 15/22* (2013.01); *H04R 3/04* (2013.01)

(58) Field of Classification Search
CPC .............. A63F 13/285; G06T 2210/28; G05B 2219/37396; G05B 2219/40137; G05B 2219/40132; G05B 3/016; G06F 2203/013–015; G06F 3/016; H04R 3/04
See application file for complete search history.

(56) References Cited

U.S. PATENT DOCUMENTS

| | | |
|---|---|---|
| 5,889,670 A | 3/1999 | Schuler |
| 6,766,299 B1 | 7/2004 | Bellomo |
| 6,864,877 B2 | 3/2005 | Braun |

(Continued)

FOREIGN PATENT DOCUMENTS

| | | |
|---|---|---|
| EP | 0999518 A1 | 5/2000 |
| JP | 0884858 A | 4/1996 |

(Continued)

OTHER PUBLICATIONS

Notice of Reasons for Refusal for corresponding JP Application No. 2019513214, 12 pages, dated Apr. 28, 2020.

(Continued)

*Primary Examiner* — Omkar A Deodhar
(74) *Attorney, Agent, or Firm* — Matthew B. Dernier, Esq.

(57) ABSTRACT

A vibration control apparatus accepts, from a user, correction information designating the content of correction in vibrating a vibration device, and vibrates the vibration device in accordance with the content of an accepted vibration instruction corrected to reflect the correction information.

12 Claims, 5 Drawing Sheets

(56) References Cited

U.S. PATENT DOCUMENTS

| | | |
|---|---|---|
| 7,010,488 B2 | 3/2006 | van Santen |
| 7,218,310 B2 | 5/2007 | Goldenberg |
| 8,248,218 B2 | 8/2012 | Yamaya |
| 8,249,276 B2 | 8/2012 | Hamada |
| 8,325,144 B1 | 12/2012 | Tierling |
| 8,487,759 B2 | 7/2013 | Hill |
| 8,727,878 B2 | 5/2014 | Longdale |
| 8,787,586 B2 | 7/2014 | Hamada |
| 9,007,445 B2 | 4/2015 | Oikawa |
| 9,070,282 B2 | 6/2015 | Clough |
| 9,098,984 B2 | 8/2015 | Heubel |
| 9,135,791 B2 | 9/2015 | Nakamura |
| 9,430,700 B2 | 8/2016 | Yagcioglu |
| 9,436,280 B2 | 9/2016 | Tartz |
| 9,542,745 B2 | 1/2017 | Moteki |
| 9,630,098 B2 | 4/2017 | Mikhailov |
| 9,753,537 B2 | 9/2017 | Obana |
| 9,792,501 B1 | 10/2017 | Maheriya |
| 9,846,484 B2 | 12/2017 | Shah |
| 9,940,716 B2 | 4/2018 | Chevassus |
| 9,946,347 B2 | 4/2018 | Nakagawa |
| 9,952,670 B2 | 4/2018 | Watanabe |
| 9,983,671 B2 | 5/2018 | Adachi |
| 10,109,161 B2 | 10/2018 | Shah |
| 10,150,029 B2 | 12/2018 | Yamano |
| 10,175,761 B2 | 1/2019 | Cruz-Hernandez |
| 10,347,093 B2 | 7/2019 | Rihn |
| 10,394,326 B2 | 8/2019 | Ono |
| 10,444,837 B2 | 10/2019 | Takeda |
| 2002/0030663 A1 | 3/2002 | Goldenberg |
| 2002/0080112 A1 | 6/2002 | Braun |
| 2002/0163498 A1 | 11/2002 | Chang |
| 2003/0030619 A1 | 2/2003 | Martin |
| 2003/0212555 A1 | 11/2003 | van Santen |
| 2004/0220812 A1 | 11/2004 | Bellomo |
| 2005/0134562 A1 | 6/2005 | Grant |
| 2007/0091063 A1 | 4/2007 | Nakamura |
| 2007/0248235 A1 | 10/2007 | Hamada |
| 2008/0204266 A1 | 8/2008 | Malmberg |
| 2008/0262658 A1 | 10/2008 | Ding |
| 2009/0017911 A1 | 1/2009 | Miyazaki |
| 2010/0016077 A1 | 1/2010 | Longdale |
| 2010/0085462 A1 | 4/2010 | Sako |
| 2010/0090815 A1 | 4/2010 | Yamaya |
| 2010/0091096 A1 | 4/2010 | Oikawa |
| 2010/0245237 A1 | 9/2010 | Nakamura |
| 2011/0039606 A1 | 2/2011 | Kim |
| 2011/0075835 A1 | 3/2011 | Hill |
| 2011/0163946 A1 | 7/2011 | Tartz |
| 2012/0232780 A1 | 9/2012 | Delson |
| 2012/0281849 A1 | 11/2012 | Hamada |
| 2013/0057509 A1 | 3/2013 | Cruz-Hernandez |
| 2013/0250502 A1 | 9/2013 | Tossavainen |
| 2013/0261811 A1 | 10/2013 | Yagi |
| 2014/0169795 A1 | 6/2014 | Clough |
| 2014/0176415 A1 | 6/2014 | Buuck |
| 2014/0212000 A1 | 7/2014 | Yagcioglu |
| 2014/0220520 A1 | 8/2014 | Salamini |
| 2014/0266644 A1 | 9/2014 | Heubel |
| 2014/0361956 A1 | 12/2014 | Mikhailov |
| 2015/0042484 A1 | 2/2015 | Bansal |
| 2015/0059086 A1 | 3/2015 | Clough |
| 2015/0070261 A1 | 3/2015 | Saboune |
| 2015/0243016 A1 | 8/2015 | Moteki |
| 2015/0273322 A1 | 10/2015 | Nakagawa |
| 2015/0297990 A1 | 10/2015 | Mahlmeister |
| 2015/0302854 A1 | 10/2015 | Clough |
| 2015/0323996 A1* | 11/2015 | Obana ................ A63F 13/2145 |
| | | 345/177 |
| 2015/0339819 A1 | 11/2015 | Chevassus |
| 2016/0012687 A1 | 1/2016 | Obana |
| 2016/0054797 A1 | 2/2016 | Tokubo |
| 2016/0124707 A1* | 5/2016 | Ermilov ................ G06F 3/012 |
| | | 345/156 |
| 2016/0132117 A1 | 5/2016 | Asachi |
| 2016/0162025 A1* | 6/2016 | Shah ...................... G06F 3/016 |
| | | 345/156 |
| 2016/0214007 A1 | 7/2016 | Yamashita |
| 2016/0310844 A1 | 10/2016 | Yamashita |
| 2016/0342213 A1 | 11/2016 | Endo |
| 2017/0038841 A1 | 2/2017 | Takeda |
| 2017/0045991 A1 | 2/2017 | Watanabe |
| 2017/0053502 A1* | 2/2017 | Shah ...................... G08B 6/00 |
| 2017/0061784 A1 | 3/2017 | Clough |
| 2017/0092084 A1 | 3/2017 | Rihn |
| 2017/0097681 A1 | 4/2017 | Ono |
| 2017/0205883 A1 | 7/2017 | Tanaka |
| 2017/0235364 A1 | 8/2017 | Nakamura |
| 2017/0242486 A1 | 8/2017 | Grant |
| 2018/0067313 A1 | 3/2018 | Sako |
| 2018/0098583 A1 | 4/2018 | Keller |
| 2018/0203509 A1 | 7/2018 | Yamano |
| 2019/0105563 A1 | 4/2019 | Yamano |
| 2019/0332174 A1 | 10/2019 | Nakagawa |
| 2019/0334426 A1 | 10/2019 | Culbertson |
| 2019/0369730 A1 | 12/2019 | Marchant |
| 2020/0225755 A1 | 7/2020 | Lee |
| 2020/0359687 A1 | 11/2020 | Scatterday |

FOREIGN PATENT DOCUMENTS

| | | |
|---|---|---|
| JP | 11226265 A | 8/1999 |
| JP | 2002199056 A | 7/2002 |
| JP | 2003228453 A | 8/2003 |
| JP | 2004129120 A | 4/2004 |
| JP | 2004157944 A | 6/2004 |
| JP | 2005058404 A | 3/2005 |
| JP | 2005190465 A | 7/2005 |
| JP | 2005332063 A | 12/2005 |
| JP | 2007071782 A | 3/2007 |
| JP | 3132531 U | 6/2007 |
| JP | 2007324829 A | 12/2007 |
| JP | 2008058102 A | 3/2008 |
| JP | 2009037582 A | 2/2009 |
| JP | 2009183751 A | 8/2009 |
| JP | 2010038707 A | 2/2010 |
| JP | 2010092436 A | 4/2010 |
| JP | 2011501296 A | 1/2011 |
| JP | 2011183374 A | 9/2011 |
| JP | 2012103852 A | 5/2012 |
| JP | 2012226482 A | 11/2012 |
| JP | 2013507059 A | 2/2013 |
| JP | 2013052046 A | 3/2013 |
| JP | 2013054645 A | 3/2013 |
| JP | 2013516708 A | 5/2013 |
| JP | 2013145589 A | 7/2013 |
| JP | 2013243604 A | 12/2013 |
| JP | 2014179984 A | 9/2014 |
| JP | 2014528120 A | 10/2014 |
| JP | 2015053038 A | 3/2015 |
| JP | 2015513143 A | 4/2015 |
| JP | 2015118605 A | 6/2015 |
| JP | 2015121983 A | 7/2015 |
| JP | 2015158461 A | 9/2015 |
| JP | 2015185137 A | 10/2015 |
| JP | 2015200994 A | 11/2015 |
| JP | 2015215712 A | 12/2015 |
| JP | 2015225521 A | 12/2015 |
| JP | 2015228064 A | 12/2015 |
| JP | 2015228215 A | 12/2015 |
| JP | 2015230516 A | 12/2015 |
| JP | 2015231098 A | 12/2015 |
| JP | 2016002797 A | 1/2016 |
| JP | 2016131018 A | 7/2016 |
| JP | 2016527601 A1 | 9/2016 |
| JP | 2017037523 A | 2/2017 |
| JP | 2017062788 A | 3/2017 |
| JP | 2017063916 A | 4/2017 |
| JP | 2018523863 A | 8/2018 |
| WO | 02073385 A1 | 9/2002 |
| WO | 2008078523 A1 | 7/2008 |
| WO | 2009035100 A1 | 3/2009 |
| WO | 2015059887 A1 | 4/2015 |
| WO | 2015121971 A1 | 8/2015 |

(56) References Cited

FOREIGN PATENT DOCUMENTS

| WO | 2015151380 A1 | 10/2015 |
| WO | 2016038953 A1 | 3/2016 |
| WO | 2016186041 A1 | 11/2016 |
| WO | 2017043610 A1 | 3/2017 |

OTHER PUBLICATIONS

International Search Report for related PCT Application No. PCT/JP2017/030345, 2 pages, dated Sep. 26, 2017.
International Search Report for related PCT Application No. PCT/JP2017/030909, 3 pages, dated Sep. 26, 2017.
International Preliminary Report on Patentability and Written Opinion for related PCT Application No. PCT/JP2017/030344, 13 pages, dated Mar. 5, 2020.
International Preliminary Report on Patentability and Written Opinion for related PCT Application No. PCT/JP2017/030345, 11 pages, dated Mar. 5, 2020.
International Preliminary Report on Patentability and Written Opinion for related PCT Application No. PCT/JP2017/030932, 16 pages, dated Mar. 12, 2020.
International Preliminary Report on Patentability and Written Opinion for related PCT Application No. PCT/JP2017/0030909, 11 pages, dated Mar. 12, 2020.
International Preliminary Report on Patentability and Written Opinion for related application PCT/JP2017/016552, 13 pages, dated Nov. 7, 2019.
International Search Report for related application PCT/JP2018/026551, 4 pages, dated Aug. 7, 2018.
Office Action for related U.S. Appl. No. 16/345,071, 10 pages, dated Feb. 19, 2020.
Office Action for related U.S. Appl. No. 16/500,651, 7 pages, dated Apr. 16, 2020.
International Search Report for related PCT Application No. PCT/JP2017/044072, 4 pages, dated Jan. 16, 2018.
International Preliminary Report on Patentability and Written Opinion for related PCT Application No. PCT/JP2017/044072, 15 pages, dated Jun. 27, 2019.
International Search Report for related PCT Application No. PCT/JP2017/044073, 2 pages, dated Jan. 23, 2018.
International Preliminary Report on Patentability and Written Opinion for related PCT Application No. PCT/JP2017/044073, 10 pages, dated Jun. 27, 2019.
International Preliminary Report on Patentability and Written Opinion for corresponding PCT Application No. PCTJP2017044074, 12 pages, dated Jun. 18, 2019.
International Search Report for corresponding PCT Application No. PCT/JP2017/044074, 4 pages, dated Jan. 16, 2018.
International Search Report for corresponding PCT Application No. PCT/JP2017/015563, 2 pages, dated Jun. 13, 2017.
International Search Report for corresponding PCT Application No. PCT/JP2017/033925, 4 pages, dated Nov. 7, 2017.
International Search Report for corresponding PCT Application No. PCT/JP2017/015740, 4 pages, dated Jul. 4, 2017.
International Search Report for corresponding PCT Application No. PCT/JP2017/016552, 2 pages, dated Jun. 20, 2017.
International Preliminary Report on Patentability and Written Opinion for corresponding PCT Application No. PCTJP2017044075, 15 pages, dated Jun. 27, 2019.
International Search Report for related PCT Application No. PCT/JP2017/030344, 4 pages, dated Oct. 10, 2017.
International Preliminary Report on Patentability and Written Opinion for related PCT Application No. PCT/JP2017/015563, 13 pages, dated Oct. 31, 2019.
International Preliminary Report on Patentability and Written Opinion for corresponding PCT Application No. PCT/JP2017/044074, 15 pages, dated Jun. 27, 2019.
Notification of Reason for Refusal for related JP Patent Application No. JP 2018-556628, 17 pages, dated Feb. 18, 2020.
International Preliminary Report on Patentability and Written Opinion for related PCT Application No. PCT/JP2017/033925 16 pages, dated Oct. 31, 2019.
International Preliminary Report on Patentability and Written Opinion for related PCT Application No. PCT/JP2017/015740 14 pages, dated Oct. 31, 2019.
Notice of Reasons for Refusal for corresponding JP Application No. 2019-537506, 4 pages, dated Nov. 18, 2020.
Decision to Grant for related JP Application No. JP2019-513523, 5 pages, dated Dec. 24, 2020.
Notification of Reasons for Refusal for related JP Application No. JP2019-537507, 8 pages, dated Dec. 14, 2020.

* cited by examiner

VIBRATION CONTROL APPARATUS

TECHNICAL FIELD

The present invention relates to a vibration control apparatus for controlling a vibration device that presents a user with vibrations, to a method for controlling the vibration device, and to a control program.

BACKGROUND ART

Some of the devices worn or manually held by a user, such as the operating device for use in connection with a home-use game machine, are equipped with a vibration mechanism that vibrates the device partially or entirely. The vibration device furnished with the vibration mechanism presents the user with vibrations by activating the mechanism in a suitably timed manner.

SUMMARY

Technical Problem

Usually, the manner in which the vibration device of the above-described existing type is vibrated is determined by the content of the process executed by an application program. In some cases, however, it may be desired by the user to vibrate the vibration device in a manner different from the content designated by the application program.

The present invention has been made in view of the above circumstances. An object of the invention is therefore to provide a vibration control apparatus capable of adjusting the manner in which to vibrate a vibration device in accordance with a user's preferences, a method for controlling the vibration device, and a control program.

Solution to Problem

According to the present invention, there is provided a vibration control apparatus for vibrating a vibration device. The vibration control apparatus includes: a correction information acceptance section configured to accept, from a user, correction information designating content of correction in vibrating the vibration device; a vibration instruction acceptance section configured to accept a vibration instruction; and a vibration control section configured to vibrate the vibration device in accordance with the content of the accepted vibration instruction corrected to reflect the correction information.

Also according to the present invention, there is provided a method for controlling a vibration device. The method includes the steps of: accepting, from a user, correction information designating content of correction in vibrating the vibration device; accepting a vibration instruction; and vibrating the vibration device in accordance with the content of the accepted vibration instruction corrected to reflect the correction information.

Also according to the present invention, there is provided a program for controlling a vibration device. The program causes a computer to implement functions including: a correction information acceptance section configured to accept, from a user, correction information designating content of correction in vibrating the vibration device; a vibration instruction acceptance section configured to accept a vibration instruction; and a vibration control section configured to vibrate the vibration device in accordance with the content of the accepted vibration instruction corrected to reflect the correction information. This program may be stored on a computer-readable nonvolatile information storage medium when offered.

DESCRIPTION OF EMBODIMENT

An embodiment of the present invention is described below with reference to the accompanying drawings.

A vibration control system 1 as one embodiment of the present invention includes a vibration control apparatus 10 and a vibration device 20 connected with the vibration control apparatus 10.

The vibration device 20 is manually held by a user or worn on his or her body. The vibration device 20 incorporates a vibration mechanism 21. The vibration device 20 operates the vibration mechanism 21 to present the user with vibrations. The vibration mechanism 21 may be any one of diverse vibration generating elements such as a linear resonant actuator, a voice coil motor, or an eccentric motor. The vibration device 20 may include various operating members such as operation buttons and levers to be operated by the user.

The vibration device 20 also incorporates a microphone 22 that picks up ambient audio. An audio signal input to the microphone 22 is transmitted to the vibration control apparatus 10. By speaking to the microphone 22, the user can issue various instructions through voice input.

Figure 1:
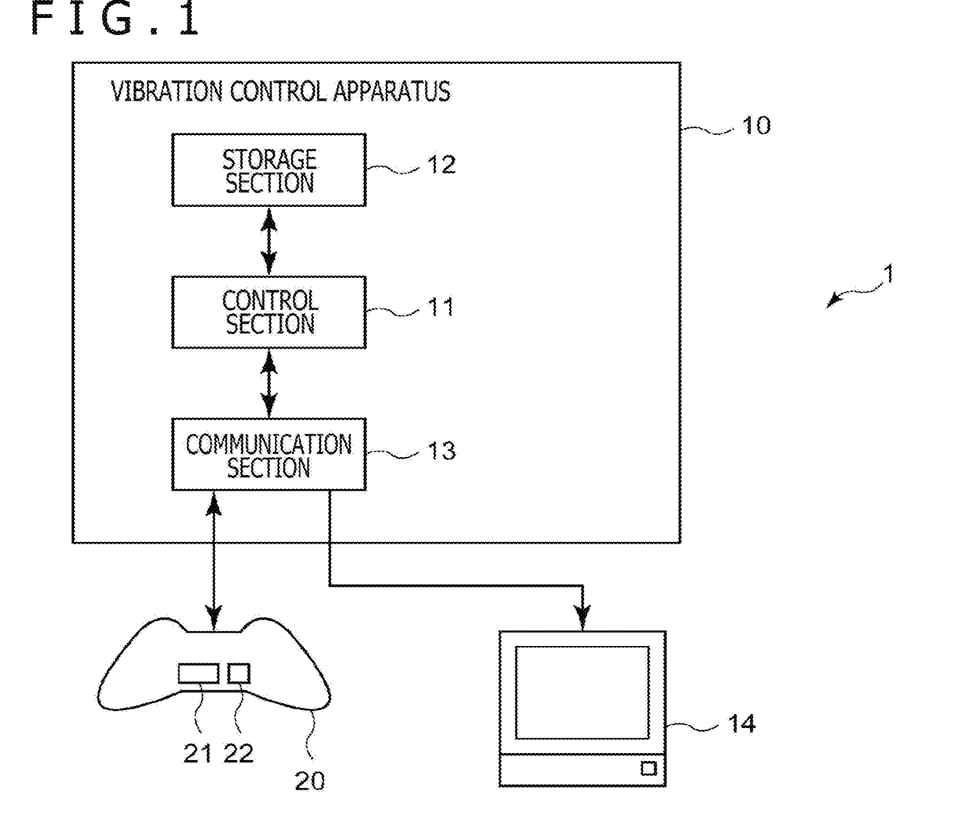
FIG. 1 is a block diagram depicting a typical configuration of a vibration control system including a vibration control apparatus embodying the present invention.

The vibration control apparatus 10 is an information processing apparatus connected communicably with the vibration device 20. As such, the vibration control apparatus 10 may be a home-use game machine or a personal computer, for example. In this embodiment, the vibration control apparatus 10 is also connected communicably with a display device 14. As depicted in FIG. 1, the vibration control apparatus 10 includes a control section 11, a storage section 12, and a communication section 13.

The control section 11 includes a program-controlled device such as a CPU that performs various information processes in accordance with a program stored in the storage section 12. Specific content of the processing performed by the control section 11 will be discussed later in detail.

The storage section 12 is typically a memory device that retains the program to be executed by the control section 11. This program may be a computer-readable program stored on a computer-readable nonvolatile storage medium and copied therefrom to the storage section 12 when offered. The storage section 12 also doubles as a work memory for the control section 11.

The communication section 13 includes a serial interface such as a Universal Serial Bus (USB) or a wireless communication interface such as Bluetooth (registered trademark). The vibration control apparatus 10 is communicably connected with the vibration device 20 via the communication section 13. Particularly in this embodiment, the communication section 13 transmits control signals to operate the vibration mechanism 21 under instructions from the control section 11. The communication section 13 further includes a communication interface for wired or wireless communication with the display device 14. Through the communication section 13, the vibration control apparatus 10 transmits to the display device 4 the data of the video to be displayed thereon.

The display device 14 displays the video based on a video signal transmitted from the vibration control apparatus 10. For example, the display device 14 may be a device worn by the user on the head, such as a head-mounted display.

Figure 2:
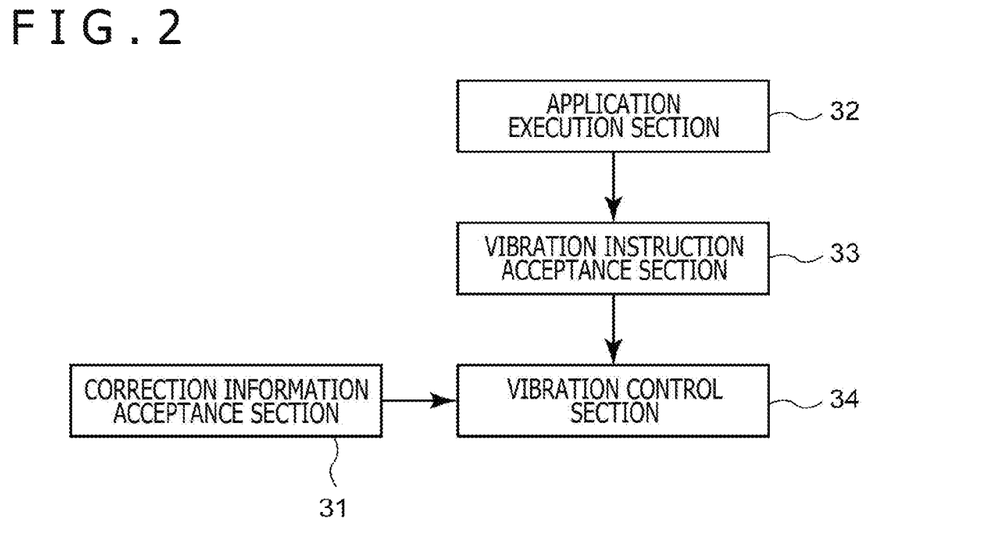
FIG. 2 is a functional block diagram indicating functions of the vibration control apparatus embodying the present invention.

What follows is an explanation of how the control section 11 operates in the vibration control apparatus 10. In this embodiment, as depicted in FIG. 2, the control section 11 functionally includes a correction information acceptance section 31, an application execution section 32, a vibration instruction acceptance section 33, and a vibration control section 34. These functions are implemented by the control section 11 operating in accordance with the program stored in the storage section 12. The program may be offered to the vibration control apparatus 10 via communication networks such as the Internet or by means of a computer-readable information storage medium such as an optical disk.

The correction information acceptance section 31 accepts correction information input from the user. When the vibration control section 34, to be discussed later, outputs a control command to vibrate the vibration device 20, the correction information as part of the instruction designates the content of correction to the vibrations. Specific examples of the correction information will be discussed later. The user inputs the correction information by operating the operation buttons of the vibration device 20 while viewing what is displayed on a screen of the display device 14, for example.

The application execution section 32 is implemented by the control section 11 executing application programs such as games. The application execution section 32 executes various processes in accordance with the content of operations performed by the user on the vibration device 20, and displays the result of the processing on the screen of the display device 14. For example, the application execution section 32 may build a virtual space in which diverse virtual objects are disposed and present the user with an image indicating how things look like inside the space.

Furthermore, the application execution section 32 outputs vibration instruction data for vibrating the vibration device 20 in accordance with the content of the processing. The vibration instruction data includes data that instructs how to vibrate the vibration mechanism 21 of the vibration device 20. For example, the vibration instruction data may include data that encodes the waveform of the vibrations to be generated by the vibration mechanism 21. In this case, an actual operation mode of the vibration mechanism 21 is defined by the amplitude and frequency of the waveform. This type of vibration instruction data may be described in a format similar to that of audio data. Also, as with the audio data, the vibration instruction data is assumed to include waveforms in which vibrations of multiple frequencies are overlaid. The vibration instruction data output from the application execution section 32 is stored into a buffer area appropriated in the storage section 12.

The vibration instruction acceptance section 33 accepts from the application execution section 32 a vibration instruction for vibrating the vibration device 20. Specifically, the vibration instruction acceptance section 33 accepts the vibration instruction by successively reading the vibration instruction data that was written to the buffer area by the application execution section 32.

The vibration control section 34 outputs to the vibration device 20 a control command for operating the vibration mechanism 21 on the basis of the content of the vibration instruction accepted by the vibration instruction acceptance section 33. The vibration device 20 operates the vibration mechanism 21 in accordance with the control command, causing the vibration mechanism 21 to generate vibrations of which the intensity and frequency reflect the content of the vibration instruction. In this manner, the vibration control section 34 causes the body of the vibration device 20 to vibrate in keeping with the status of games executed by the application execution section 32, thereby presenting the user with the vibrations.

Furthermore, the vibration control section 34 of this embodiment corrects the content of the vibration instruction based on the correction information accepted by the correction information acceptance section 31, and outputs to the vibration device 20 a control command for operating the vibration mechanism 21 in a manner reflecting the corrected content. The vibration control section 34 performing the above correction process allows the user to adjust the vibration content as desired. What follows is an explanation of the correction information and specific examples of the correction process reflecting the content of the correction information.

Explained below is a first example in which the input of the correction information for designating a vibration level is accepted. In this example, the user designates the vibration level (intensity of vibrations) as the correction information. The vibration control section 34 varies the vibration intensity included in the vibration instruction data in accordance with the designated vibration level. For example, in the case where the vibration level is set as a numerical value ranging from 0 to 100, the vibration control section 34 corrects the vibration intensity included in the vibration instruction data in proportion to the set value. As an example, if the vibration level is designated at 100, the vibration control section 34 outputs the content of the vibration instruction data without correction. If the vibration level is designated at 50, the vibration control section 34 makes corrections to cut the vibration intensity in half.

In the case where a single value is designated in this manner by the user as the correction information regarding the vibration level (the value will be referred to as the set value V hereunder), the vibration control section 34 may vary the content of correction to each frequency band, without uniformly correcting the vibration intensity included in the vibration instruction data. Where the vibrations of multiple frequencies are included in the vibration instruction data, there exist differences in sensation between the frequencies; people may have relatively more difficulty in feeling the vibrations at high frequencies than at low frequencies, for example. For this reason, if corrections are made to lower the vibration level uniformly for all frequencies, the vibrations at a specific frequency may become undetectable more quickly than the vibrations at the other frequencies. Thus, the vibration control section 34 corrects the vibration level differently for each of the multiple frequency bands. This allows the user to feel that the overall vibration intensity is corrected.

Figure 3:
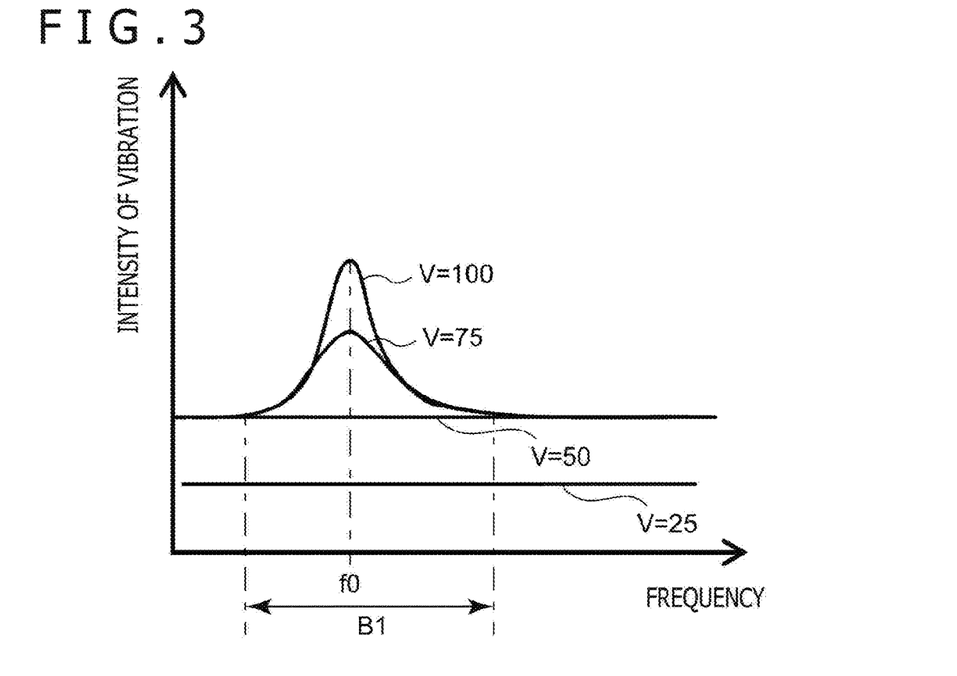
FIG. 3 is a graphic chart depicting typical content of correction reflecting set values of vibration levels.

Specifically, in the case where the set value V of the vibration level is equal to or higher than a predetermined threshold value Vth, for example, the vibration control section 34 corrects the vibrations only in a predetermined frequency band B1, where the set value V is lower than the threshold value Vth, the vibration control section 34 corrects the vibrations in frequency bands wider than the predetermined frequency band B1 (e.g., in all frequency bands). FIG. 3 indicates a specific example of the correction content in this case. In the graph, the horizontal axis stands for vibration frequencies and the vertical axis for the intensity of vibrations generated when a predetermined voltage is input to the vibration mechanism 21. In this example, the threshold value V is set to 50 and the predetermined frequency band B1 has a range centering on a resonance frequency f0. Here, the resonance frequency f0 is a frequency at which the intensity of the vibrations generated by the vibration device 20 when given the same input voltage is maximized.

In the example of FIG. 3, where the user designates the set value V of the vibration level at 100, the vibration control section 34 outputs a control command to faithfully implement the content of the vibration instruction data without correcting the vibration level. In this case, as indicated with a curve at V=100 in the graph, the vibrations at the resonance frequency f0 are maximized. By contrast, when the set value V of the vibration level is reduced, the vibration control section 34 makes corrections to lower the vibration intensity near the resonance frequency f0. In this case, as indicated with a curve at V=75 in the graph, the vibrations near the resonance frequency f0 are lower in intensity than the vibrations at V=100 but remain the same in intensity as at V=100 in the low and high frequency bands with no corrections made therein. Furthermore, where the set value V of the vibration level is 50, the vibration control section 34 makes corrections to lower the vibrations in the frequency band B1. At this time, the vibration level is lowered more significantly the closer the frequency is to the resonance frequency f0. As a result, as indicated with a straight line at V=50 in the graph, the intensity of the vibrations remains unchanged at any frequency at which they are generated. Where the set value V is lower than 50, corrections are made to reduce the vibration intensity in all frequency bands. Consequently, as indicated with a straight line at V=25, for example, in the graph, the vibration level is lower at all frequencies than at V=50.

In the example in FIG. 3, the lower the set value V becomes, the wider the frequency band targeted for correction. When the set value V is lower than the threshold value Vth, corrections are made to all frequency bands. Also, the closer the frequency is to the resonance frequency f0, the larger the proportion by which the vibrations are reduced in conjunction with the decreasing set value V. By contrast, the vibration level at frequencies distant from the resonance frequency f0 is not immediately reduced in conjunction with the dropping set value V. This makes it possible to avoid the situation where the vibrations at hard-to-detect frequencies for the user quickly become undetectable.

It was explained above that where the set value V is equal to or higher than the threshold value Vth, only the frequency band B1 near the resonance frequency f0 is targeted for correction. Alternatively, a frequency band equal to or lower than a predetermined frequency may be corrected preferentially. Specifically, when the set value V is equal to or higher than the threshold value Vth, for example, the vibration control section 34 may reduce the vibrations only in a frequency band equal to or lower than a predetermined frequency band. When the set value becomes lower than the threshold value Vth, the vibration control section 34 may reduce the vibrations in a wider frequency band (e.g., in all frequency bands). This makes it possible to avert the situation where the vibrations at hard-to-detect frequencies for the user quickly become undetectable.

It was explained above that the vibrations are corrected differently at each of the frequencies with respect to the set value V. Alternatively, the vibration control section 34 may vary the content of correction with the vibration intensity designated in the vibration instruction data. That is possible because if corrections were made to uniformly reduce the vibrations at both high and low levels of vibrations, the vibrations at low vibration levels would become undetectable more quickly than those at high vibration levels.

Figure 4:
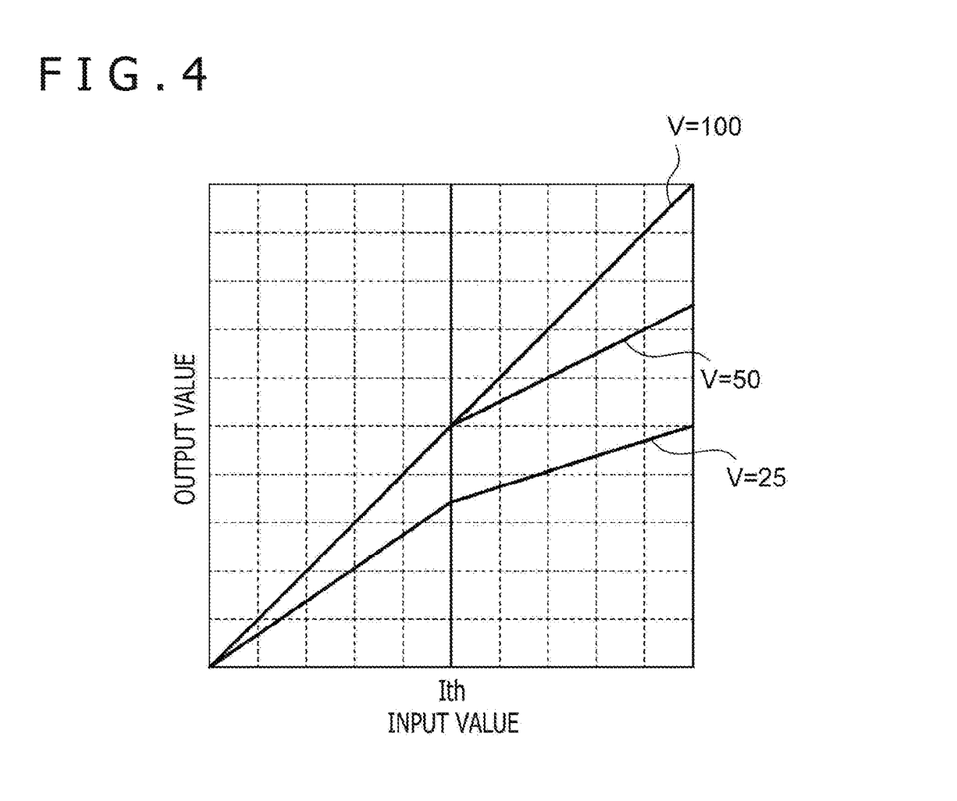
FIG. 4 is a graphic chart depicting other typical content of correction reflecting set values of vibration levels.

FIG. 4 depicts a specific example of the content of correction in the above case. In this graph, the horizontal axis stands for input values before correction (i.e., vibration intensity designated in the vibration instruction data) and the vertical axis denotes output values after correction (i.e., voltages actually input to the vibration mechanism 21). As indicated with a straight line at V=100 in the graph, where the set value V is designated at 100, the vibration control section 34 outputs the input value without correction to the vibration device 20 regardless of the magnitude of the input value. In the case where the set value V is designated between 50 and 100, the vibration control section 34 makes corrections to reduce the vibrations if the input value exceeds a threshold value Ith but does not make any corrections if the input value is equal to or lower than the threshold value Ith as in the case where V=100. Here, the higher the input value becomes, the larger the amount of corrections to be made. This makes it possible to reduce only the relatively large vibrations while allowing relatively small vibrations to be output uncorrected. Further, when the set value V is lower than 50, corrections are made to reduce the overall vibrations. In this case, too, the proportion of corrections is different between two situations: where the input value is equal to or lower than the threshold value Ith, and where the input value exceeds the threshold value Ith. For this reason, the higher the vibration level is designated, the more reduced the corrected vibration level. The range of values that may be taken by the corrected output value is made smaller than the range of yet-to-be-corrected input values. These corrections make it possible to avoid the situation where the relatively small vibrations are so reduced as to become undetectable by the user.

Explained next is a second example in which the designation of the vibration level at each different frequency is accepted from the user. In the above-described first example, the user adjusts the overall vibration level using a single set value V. In the second example, by contrast, the user designates the set value of the vibration level for each of multiple frequency bands. In accordance with the multiple set values thus designated, the vibration control section 34 corrects the vibration level in each of the individual frequency bands. In this manner, as with equalizers in audio equipment, the user may adjust the vibration intensity at different frequencies as desired, raising the vibrations either at low frequencies or at high frequencies, for example.

Further in this example, the vibration control apparatus 10 may vary the audio output level (i.e., volume) in relation to the designated vibration level. In this case, it is assumed that the vibration device 20 is equipped with speakers and that the vibration control apparatus 10 has an additional function of reproducing the audio signal from the speakers in response to demands from the application execution section 32. It is further assumed that the vibration control apparatus 10 adjusts the volume level of the audio signal for each of different frequency bands. Although the vibration control apparatus 10 could accept from the user the designated volume level for each different frequency band, it takes time and effort for the user to designate both the vibration level and the audio level for each frequency band. Thus, the vibration control apparatus 10 causes the content of either the vibration level or the volume level designated by the user to be reflected in the other. For example, suppose that the user designates the set value of the vibration level at 50 for a frequency band of 300 to 400 Hz in which the vibrations and the audio are overlaid. In this case, the vibration control apparatus 10 assumes that the audio volume is also designated at 50 and adjusts the volume accordingly. Under such control, the user has only to designate either the vibration level or the volume level in order to adjust both levels as desired.

Although it was assumed above that the vibration device 20 is furnished with speakers, the vibration control apparatus 10 may alternatively cause the audio signal to be reproduced from speakers connected therewith independently of the vibration device 20. As another alternative, the speakers may be incorporated in another device such as the display device 14. In these cases, the vibration control apparatus 10 may also adjust the volume of the audio reproduced from the speakers in relation to the vibration level designated by the user. In particular, when the audio is corrected in relation to the vibration level before being reproduced in synchronism with the vibration device 20 during vibration, the user is presented effectively with both the audio and the vibrations.

Explained next is a third example in which the designation to vary the rise and fall of vibrations is accepted from the user. In this example, at least either the time required for the vibrations to rise or the time required for the vibrations to fall is designated by the user.

In the case where the vibration rise time is designated, the vibration control section 34 corrects the content of newly generated vibrations at the start thereof in such a manner that the vibrations will gradually increase in intensity over the designated time. Specifically, the vibration control section 34 analyzes the vibration instruction data to identify the timing for vibrations to rise (i.e., the timing at which the vibration level, so far at 0 or below a predetermined value, rises above that value). The target time for correction is from the rise timing until the designated rise time elapses. The vibration control section 34 makes corrections to keep the vibrations smaller the earlier the timeline from the start of the target time for correction so that the vibration level will gradually increase from the start to the end of the correction target time. Such corrections prevent large vibrations from occurring abruptly. The vibrations are thus presented in a graduated manner.

In the case where the vibration fall time is designated, the vibration control section 34 analyzes the vibration instruction data to identify the timing for the vibrations to fall (i.e., the timing at which the vibration level, so far above a predetermined level, falls below that level). The target time for correction is the designated fall time that ends at the fall timing. The vibration control section 34 makes corrections to keep the vibrations smaller the closer the timeline is to the end of the correction target time so that the vibration level will gradually decrease from the beginning to the end of the correction target time. Such corrections prevent large vibrations from ending abruptly. The vibrations are thus made gradually to come to an end.

Alternatively, the vibration control section 34 may not make the end of the correction target time coincide with the vibration fall timing but may perform the process of making corrections such that the vibrations added at the end starting at the fall timing will be repeated over the designated fall time while gradually decreasing in intensity. This makes it possible to end the vibrations not abruptly at the vibration end timing designated by the vibration instruction data but gradually from that timing in a lingering manner. The vibration content added at this point may be the vibrations that are repeated while decreasing in intensity over a predetermined ending period included in the vibration instruction data.

Explained next is a fourth example in which the designation to accentuate vibrations is accepted from the user. In this example, the vibration control section 34 performs a filtering process for modifying the vibration waveform included in the vibration instruction data to correct the vibration content in such a manner that the user will feel the vibrations more accentuated. Explained below are some specific examples of filtering for accentuating the vibrations.

Figure 5:
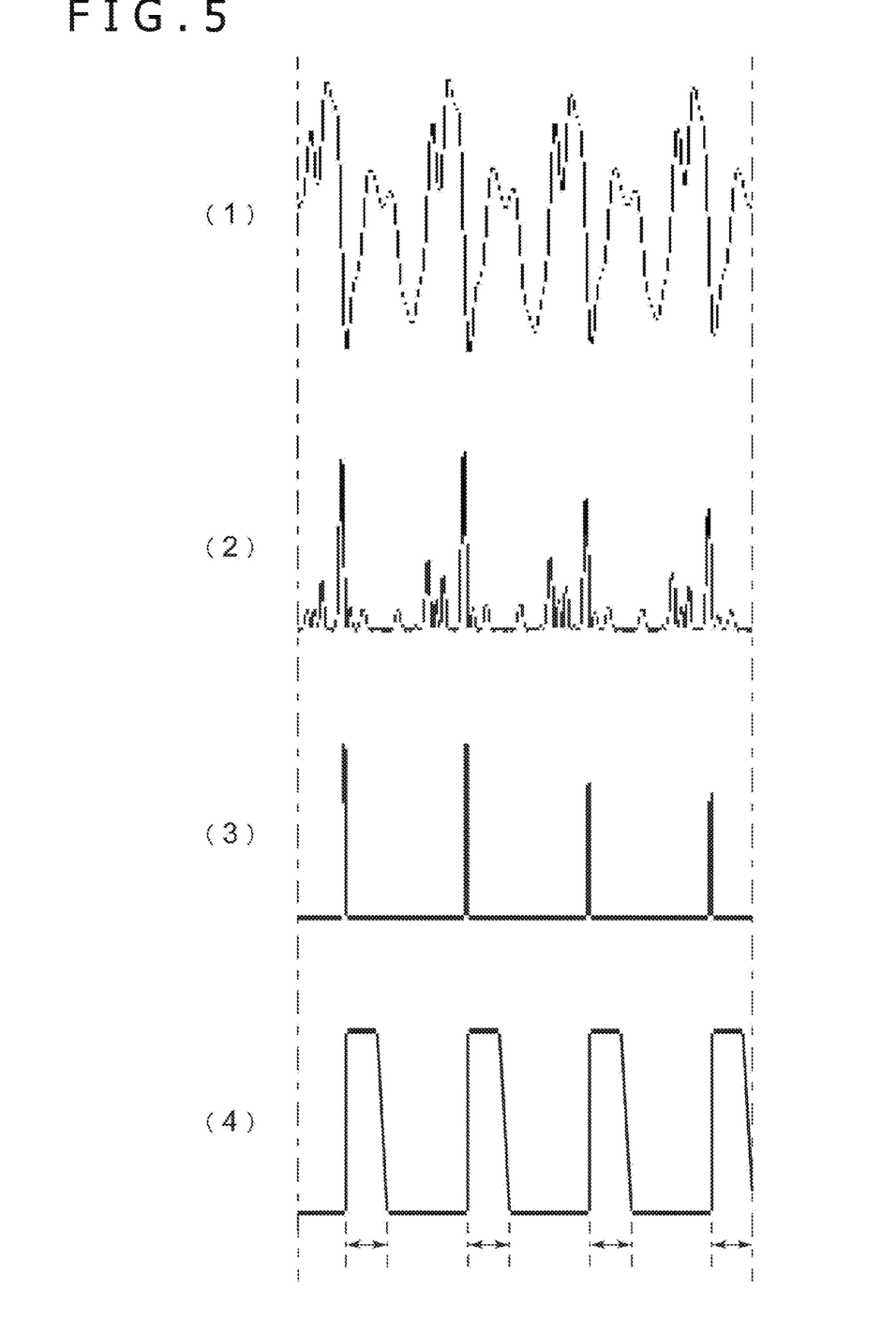
FIG. 5 is an explanatory diagram explaining a first example of a correction process for accentuating vibrations.

A first filtering example in which the vibrations are accentuated is explained with reference to FIG. 5. It is assumed here that the vibration waveform in Subfigure (1) in FIG. 5 is designated by the vibration instruction data. Given the vibration waveform, the vibration control section 34 calculates the absolute value of a differential amplitude value per unit time and squares the calculated value for normalization. This calculation provides the waveform depicted in Subfigure (2) in FIG. 5. The waveform indicates that a large peak appears at a point in time at which the amplitude of the vibrations changes abruptly.

Further, the vibration control section 34 performs threshold processing on the waveform in Subfigure (2) in FIG. 5 to eliminate the peaks equal to or below a predetermined threshold value while leaving those thereabove intact. This provides the waveform depicted in Subfigure (3) in FIG. 5. The vibration control section 34 proceeds to adjust the waveform in Subfigure (3) in FIG. 5 so as to widen its pulse width. This provides a waveform that includes rectangular waves such as are depicted in Subfigure (4) in FIG. 5. Moreover, the vibration control section 34 makes corrections to the initial vibration waveform in Subfigure (1) in FIG. 5 in such a manner as to intensify the vibrations over a time period (indicated by arrows in the subfigure) during which the rectangular waves of Subfigure (4) in FIG. 5 are output. In this manner, corrections are made to emphasize the change over time in the vibrations so that the user will feel the vibrations more accentuated.

Figure 6:
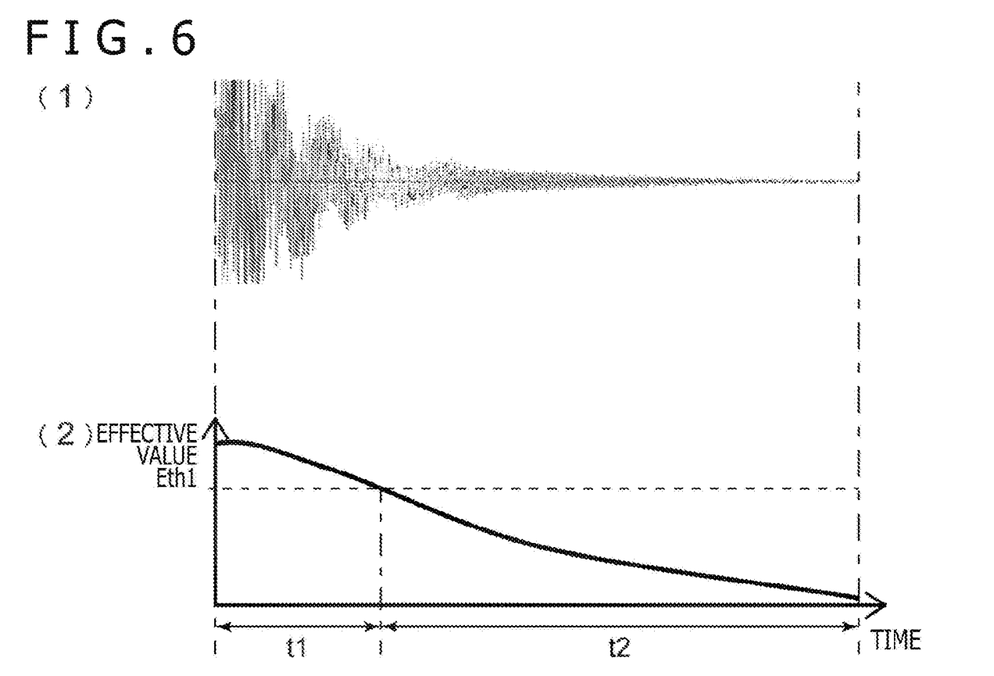
FIG. 6 is an explanatory diagram explaining a second example of the correction process for accentuating vibrations.

A second filtering example in which the vibrations are accentuated is explained with reference to FIG. 6. It is assumed here that the vibration waveform in Subfigure (1) in FIG. 6 is designated by the vibration instruction data. Given the vibration waveform, the vibration control section 34 calculates the effective value of the waveform per unit time. Subfigure (2) in FIG. 6 is a graph that depicts the change over time in the effective value of the waveform. A time period t1 during which the effective value exceeds a predetermined threshold value Eth1 is targeted for the correction process. The vibration control section 34 makes corrections to the time period t1 to intensify the vibrations. Alternatively, the vibration control section 34 may perform corrections to intensify only those of the vibrations in the time period t1 which fall in a predetermined frequency band.

The predetermined frequency band in this case may be lower than a predetermined frequency or may be a frequency band including the resonance frequency.

As another alternative, the vibration control section 34 may target for the correction process a time period t2 during which the effective value of the waveform is lower than the predetermined threshold value Eth1. In this case, as opposed to the above example of performing the correction process on the time period t1, the vibration control section 34 makes corrections to the time period t2 in such a manner as to reduce the vibrations as a whole or weaken only the vibrations in a predetermined frequency band. This filtering emphasizes the vibrations having larger effective values more than those with smaller effective values, thereby allowing the user to feel the vibrations more accentuated.

Figure 7:
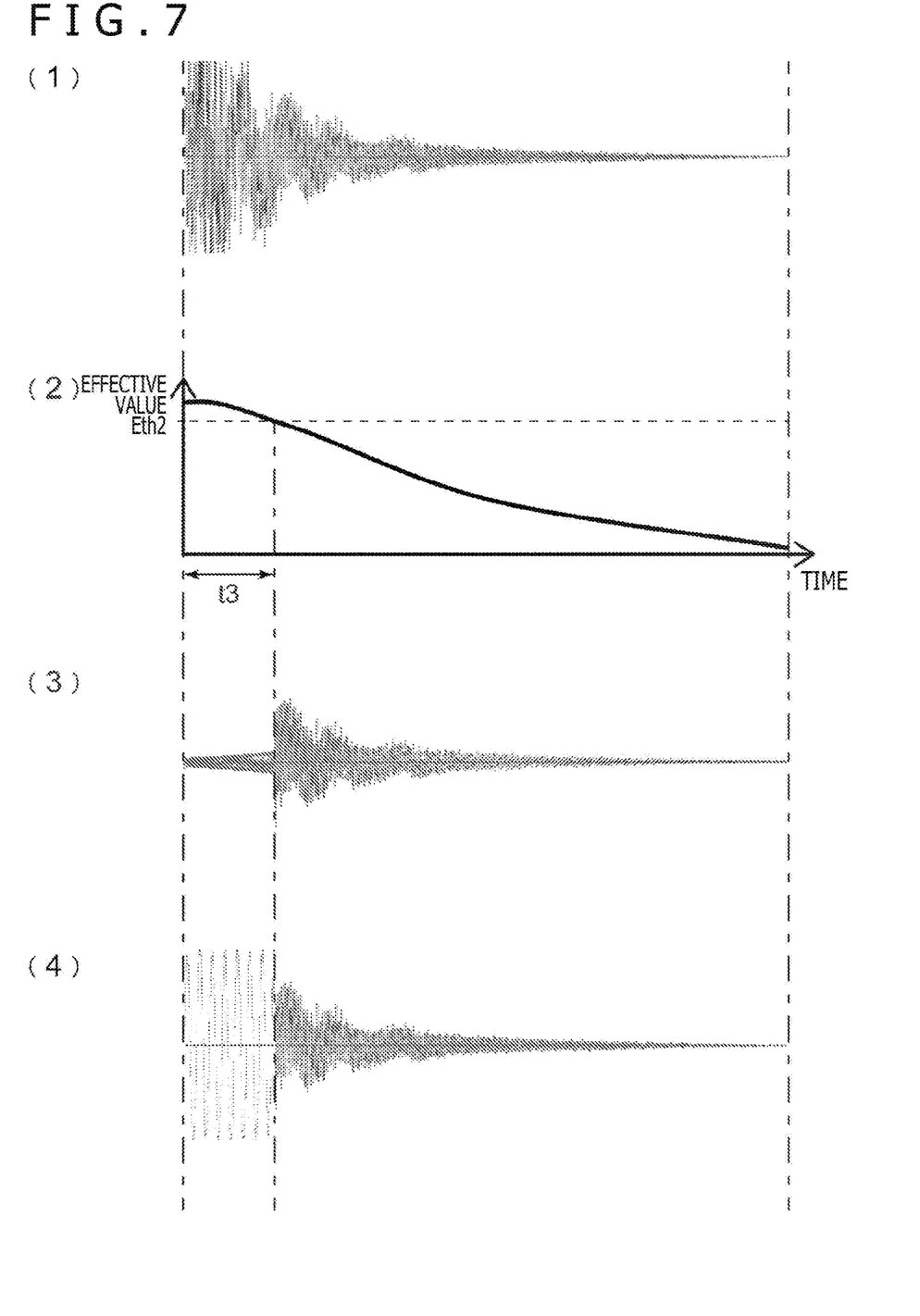
FIG. 7 is an explanatory diagram explaining a third example of the correction process for accentuating vibrations.

A third filtering example in which the vibrations are accentuated is explained with reference to FIG. 7. It is assumed here that the vibration waveform in Subfigure (1) in FIG. 7 is designated by the vibration instruction data. As in the second example of filtering for accentuation, the vibration control section 34 first calculates the effective value of the waveform per unit time. This provides the graph depicted in Subfigure (2) in FIG. 7. The vibration control section 34 then identifies as the correction target a time period t3 during which the effective value of the waveform is higher than a predetermined threshold value Eth2. The vibration control section 34 makes corrections to the time period t3 to reduce the vibrations in intensity. Subfigure (3) in FIG. 7 depicts a state in which this correction process has been carried out. Further, the vibration control section 34 adds rectangular waves at a predetermined frequency to the time period t3 during which the vibrations are lowered in intensity. The sine waves may be such as to constitute a waveform of vibrations of which the frequency is resonant with the vibration device 20. Subfigure (4) in FIG. 7 depicts a state in which the sine waves are added. This makes it possible to add the vibrations whose frequency is easily felt by the user to the time period t3 during which accentuated vibrations are desired. As with the second example of filtering for accentuation, the third example also emphasizes the vibration having larger effective values more than those having smaller effective values.

By carrying out the above-described filtering processing on the vibration waveform, the vibration control section 34 accentuates the vibrations as designated by the vibration instruction data. Incidentally, the filtering processes discussed above are only examples. The vibration control section 34 may adopt some other suitable correction method for accentuating the vibrations.

The vibration control section 34 may perform multiple correction processes such as those descried above in combination. In such a case, the correction information acceptance section 31 accepts multiple types of correction information from the user, and performs on one type of correction instruction data the correction process reflecting each of the multiple types of correction information.

It was explained above that the user operates controls such as the operation buttons in inputting the correction information for correcting the vibrations. Alternatively, the user may input the correction information using various methods. As a specific example, the user may input the correction information by speaking instruction content to the microphone 22 attached to the vibration device 20. In this case, the correction information acceptance section 31 identifies the speech content from the user by performing speech recognition processing on the audio signal input to the microphone 22, thereby accepting the correction information reflecting the speech content. This allows the user to intuitively adjust the vibration content.

For example, the correction information acceptance section 31 may accept from the user the speech content in the following manner: where the set value V of the vibration level indicated in the first example is used as the correction information, the correction information acceptance section 31, given an instruction "Intensify vibration" from the user, updates accordingly the set value V to a higher value than the current setting. Conversely, when given an instruction "Reduce vibration," the correction information acceptance section 31 updates the set value V of the vibration level to a value lower than the current setting.

Also, when given a speech "Vibration is not accentuated," the vibration control section 34 assumes that accentuation of vibration is designated and thus performs the above-described filtering process to accentuate the vibrations. When given a speech "Give me finer vibration," the vibration control section 34 performs the correction process of intensifying the vibrations in high frequency bands and reducing the vibrations in low-frequency bands. When given a speech "Give me stronger vibration," the vibration control section 34 may perform either the filtering process of accentuating the vibrations or the correction process of intensifying the vibrations in low frequency bands. When given a speech "Vibration is itchy," the vibration control section 34 makes corrections to reduce the vibrations in high frequency bands. When given a speech "Vibration is annoying," the vibration control section 34 may cause the vibration device 20 to stop generating the vibrations altogether.

Also, a speech "Vibration is out of step," for example, may probably point to the discrepancy between the timing of vibration generation and the timing of audio reproduction. In this case, there generally is a possibility that audio reproduction is delayed. Thus, the vibration control section 34 performs the process of delaying the generation of vibration with respect to the timing designated by the vibration instruction data. If the user still issues a similar instruction even after execution of the delaying process, the vibration control section 34 may discontinue the process of delaying the vibration generation and may delay the timing of audio reproduction instead.

According to the vibration control apparatus 10 of the above-described embodiment, the content of the instruction issued by the application execution section 32 is adjusted in a manner reflecting the user's preferences.

Incidentally, the embodiment discussed above is not limitative of how the present invention may be implemented. For example, although it was explained above that the vibration device 20 is an operation device that accepts input of the user's operations, this is not limitative of the vibration device 20. Alternatively, the vibration device 20 may be either used solely for presenting the user with vibrations or used also for other purposes.

Whereas it was explained above that the user who actually utilizes the vibration device 20 inputs the correction information, the vibration control apparatus 10 may alternatively acquire the correction information in some other suitable manner. Specifically, the vibration control apparatus 10 may acquire the correction information input by another user to correct accordingly the content of the vibrations presented to the user. As another alternative, the vibration control apparatus 10 may receive via a communication network the correction information recommended and distributed by distribution servers so as to correct accordingly the content of the vibrations presented to the user. In this case, the user has no need to specify the correction content. Instead, the vibration control apparatus 10 may correct the vibration content by referring to the correction information used by other users, for example.

It was further explained above that a computer independent of the vibration device 20 performs the correction process. Alternatively, a microcomputer incorporated in the vibration device 20, for example, may carry out the correction process in a manner reflecting the correction information accepted from the user. In this case, the computer inside the vibration device 20 functions as the vibration control apparatus embodying the present invention.

REFERENCE SIGNS LIST

1 Vibration control system, 10 Vibration control apparatus, 11 Control section, 12 Storage section, 13 Communication section, 14 Display device, 20 Vibration device, 21 Vibration mechanism, 22 Microphone, 31 Correction information acceptance section, 32 Application execution section, 33 Vibration instruction acceptance section, 34 Vibration control section

The invention claimed is:

1. A vibration control apparatus for vibrating a vibration device, the vibration control apparatus comprising:
   a correction information acceptance section configured to accept, from a user, correction information designating content of correction in vibrating the vibration device;
   a vibration instruction acceptance section configured to accept a vibration instruction; and
   a vibration control section configured to vibrate the vibration device in accordance with the content of the accepted vibration instruction corrected to reflect the correction information, wherein:
   the correction information acceptance section accepts a set value for designating a vibration level as the correction information,
   the vibration control section corrects the vibration level included in the vibration instruction in accordance with the set value using different content for each of a plurality of frequency bands,
   the vibration control section targets a limited frequency band in correcting the vibration level when the set value is equal to or larger than a predetermined value, and
   the vibration control section further targeting a frequency band wider than the limited frequency band in correcting the vibration level when the set value is smaller than the predetermined value.

2. The vibration control apparatus according to claim 1, wherein
   the correction information acceptance section accepts a set value for designating a vibration level as the correction information, and
   the vibration control section varies the correction content reflecting the set value in accordance with vibration intensity designated by the vibration instruction.

3. The vibration control apparatus according to claim 1, wherein
   the correction information acceptance section accepts a set value for designating a vibration level as the correction information regarding each of a plurality of frequency bands, and
   the vibration control section corrects the vibration level included in the vibration instruction in accordance with the set value designated for each of the frequency bands.

4. The vibration control apparatus according to claim 3, further comprising an audio control section configured to reproduce an audio signal from a speaker, wherein
   the vibration control section corrects the vibration level included in the vibration instruction in accordance with the designated set value, and
   the audio control section corrects, for at least one of the frequency bands, an audio level included in the audio signal regarding the frequency band in accordance with the set value of the vibration level accepted by the correction information acceptance section with respect to the frequency band.

5. The vibration control apparatus according to claim 1, wherein
   the correction information acceptance section accepts a rise time of vibration as the correction information, and
   the vibration control section corrects, in accordance with the rise time, the content of vibration included in the vibration instruction at the vibration rise time.

6. The vibration control apparatus according to claim 1, wherein
   the correction information acceptance section accepts a fall time of vibration as the correction information, and
   the vibration control section corrects, in accordance with the fall time, the content of vibration included in the vibration instruction at the vibration fall time.

7. The vibration control apparatus according to claim 1, wherein
   the correction information acceptance section accepts the designation to accentuate vibration as the correction information, and
   the vibration control section emphasizes the change over time in the vibration in accordance with the designation.

8. The vibration control apparatus according to claim 1, wherein
   the correction information acceptance section accepts the designation to accentuate vibration as the correction information; and
   the vibration control section emphasizes the vibration having a large a type of effective value in accordance with the designation.

9. The vibration control apparatus according to claim 1, wherein the correction information acceptance section identifies the content of a speech uttered by the user, the correction information acceptance section further accepting the correction information in accordance with the identified speech content.

10. A method for controlling a vibration device, the method comprising:
   accepting, from a user, correction information designating content of correction in vibrating the vibration device;
   accepting a vibration instruction; and
   vibrating the vibration device in accordance with the content of the accepted vibration instruction corrected to reflect the correction information, wherein:
   the accepting correction information includes accepting a set value for designating a vibration level as the correction information, and
   the method further comprises:
   correcting the vibration level included in the vibration instruction in accordance with the set value using different content for each of a plurality of frequency bands,
   targeting a limited frequency band in correcting the vibration level when the set value is equal to or larger than a predetermined value, and targeting a frequency band wider than the limited frequency band in correcting the vibration level when the set value is smaller than the predetermined value.

11. A non-transitory, computer readable storage medium containing a computer program, which when executed by a computer, causes the computer to control a vibration device, by carrying out actions, comprising:
  accepting, from a user, correction information designating content of correction in vibrating the vibration device;
  accepting a vibration instruction; and
  vibrating the vibration device in accordance with the content of the accepted vibration instruction corrected to reflect the correction information, wherein:
  the accepting correction information includes accepting a set value for designating a vibration level as the correction information, and
  the actions further comprise:
  correcting the vibration level included in the vibration instruction in accordance with the set value using different content for each of a plurality of frequency bands,
  targeting a limited frequency band in correcting the vibration level when the set value is equal to or larger than a predetermined value, and
  targeting a frequency band wider than the limited frequency band in correcting the vibration level when the set value is smaller than the predetermined value.

12. A vibration control apparatus for vibrating a vibration device, the vibration control apparatus comprising:
  a correction information acceptance section configured to accept, from a user, correction information designating content of correction in vibrating the vibration device;
  a vibration instruction acceptance section configured to accept a vibration instruction; and
  a vibration control section configured to vibrate the vibration device in accordance with the content of the accepted vibration instruction corrected to reflect the correction information, wherein:
  the correction information acceptance section accepts a set value for designating a vibration level as the correction information regarding each of a plurality of frequency bands,
  the vibration control section corrects the vibration level included in the vibration instruction in accordance with the set value designated for each of the frequency bands,
  the vibration control apparatus according further comprises an audio control section configured to reproduce an audio signal from a speaker,
  the vibration control section corrects the vibration level included in the vibration instruction in accordance with the designated set value, and
  the audio control section corrects, for at least one of the frequency bands, an audio level included in the audio signal regarding the frequency band in accordance with the set value of the vibration level accepted by the correction information acceptance section with respect to the frequency band.

* * * * *